(No Model.)
F. M. TRAVIS.
DRIER FOR FRUIT, &c.
No. 298,916.  Patented May 20, 1884.
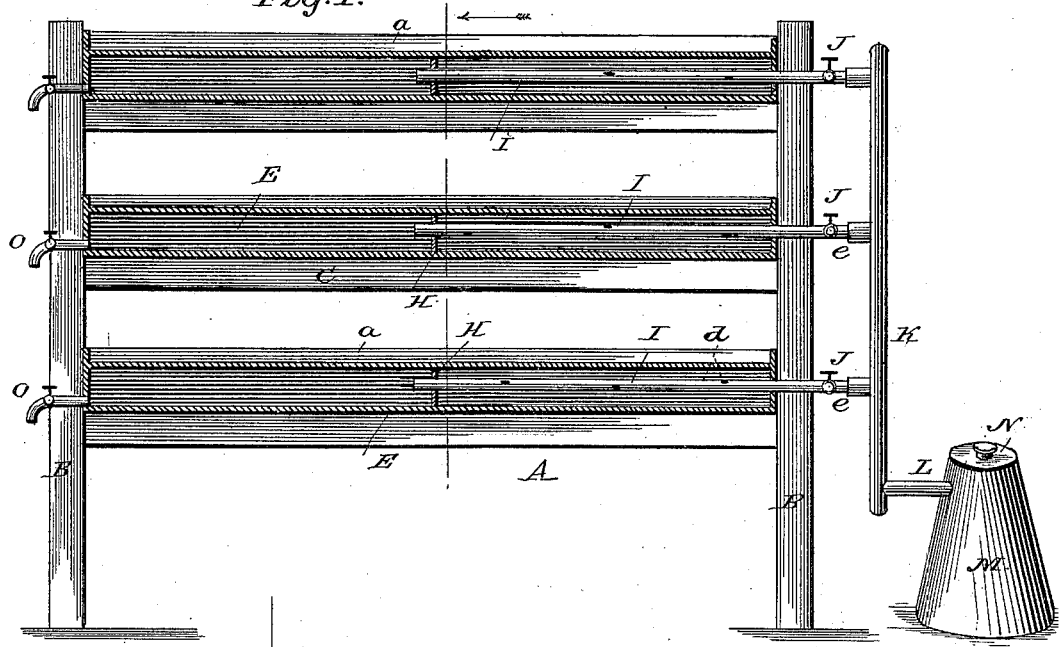
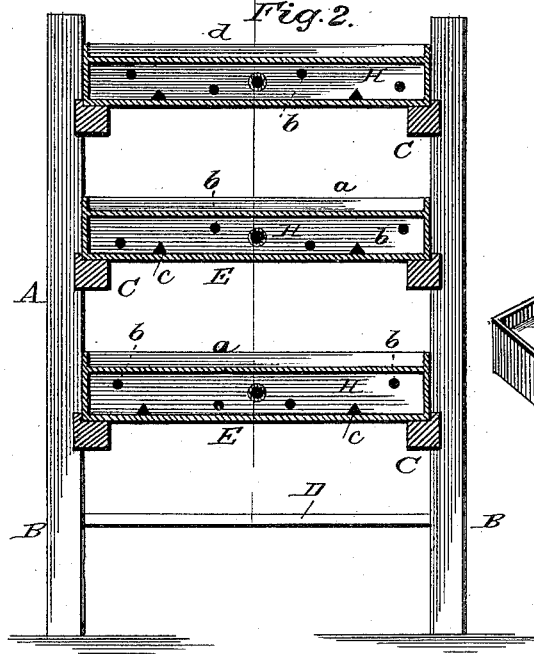
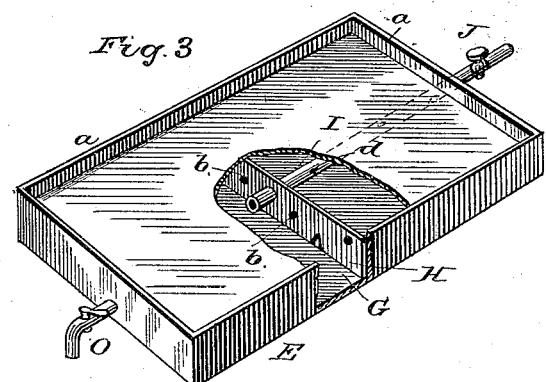
WITNESSES:
Fred. G. Dieterich.
Franklin H. Hough.
INVENTOR.
Francis M. Travis
by Wm. C. Henderson
ATTORNEY

UNITED STATES PATENT OFFICE.

FRANCIS M. TRAVIS, OF NEW LONDON, VIRGINIA.

DRIER FOR FRUIT, &c.

SPECIFICATION forming part of Letters Patent No. 298,916, dated May 20, 1884.

Application filed November 5, 1883. (No model.)

*To all whom it may concern:*

Be it known that I, FRANCIS M. TRAVIS, a citizen of the United States, residing at New London, in the county of Caroline and State of Virginia, have invented certain new and useful Improvements in Driers for Fruit and other Articles; and I do hereby declare the following to be a full, clear, and exact description of the invention, such as will enable others skilled in the art to which it appertains to make and use the same, reference being had to the accompanying drawings, in which—

Figure 1 is a vertical longitudinal section through the drier; Fig. 2, a transverse section through Fig. 1, and Fig. 3 a perspective of one of the trays.

My invention relates to driers for fruit and other articles, and it has for its object to produce a drier which will be simple and cheap of production, and in which the heat can be regulated so as to throw it more or less onto the top or bottom tray, or any intermediate one, as found desirable; and to these ends it consists in the construction and the combination of parts hereinafter particularly described, and then sought to be specifically described by the claims.

In the drawings, the letter A indicates an upright rectangular frame, the end posts, B, of which are connected by longitudinal bars C and braced by transverse bars D. The longitudinal bars project inwardly a short distance from the end posts, so as to form ways on which the trays E may slide, and may be recessed, as shown in Fig. 2, so that the bottom of the tray may fit down therein, which recesses may terminate just inside of the ends of the bars, so that when the trays are set down into the same they cannot be moved endwise until lifted out of the recesses and rested on top of the bars.

The trays E, of which there may be any desired number, may be made of metal, or of wood lined with metal, and are formed with a bottom chamber, G, and a flange, $a$, extending above the top surface of the tray, and such surface may be a removable plate supported in any suitable manner above the bottom of the tray. In the bottom chamber, about midway between its ends, there is a transverse partition, H, dividing the chamber into two sections, the said partition having a series of perforations, $b$, and also having one or more notches, $c$, cut or otherwise formed in its lower edge. Each tray has a pipe, I, extending longitudinally through one section of its chamber and terminating just the other side of the transverse partition, near the center of the tray, after passing through it. This pipe is perforated with holes $d$ along that portion within the section of the chamber through which it passes, and outside of the tray is provided a valve, J, and at that end connects with a vertical steam-supply pipe, K, the connection of each pipe I with the vertical pipe being made by passing the end of pipe I into a branch pipe, $e$, extending laterally from the pipe K, the joint being packed or in any other well-known way made steam-tight. The connection of pipe I with the steam-supply pipe is such that the two pipes can be easily separated, so as to allow any one of the trays to be removed from its frame.

The steam-pipe K is connected by a pipe, L, with a vessel, M, which represents a steam-generator that may be of any desired form, and which may be filled with water by removing the cover N. The pipe connecting the steam-supply pipe with the generator will be of sufficient length to permit the generator to be set over the hole of any ordinary cooking-stove or other heating-chamber.

Each tray will be provided with a stop-cock, O, for the withdrawal of the water of condensation from the steam-chamber, which water may be returned to the generator by any suitable conveyer.

The operation is as follows: The fruit or other article to be dried is placed on top of the tray. Steam is generated and passes into the main supply-pipe, and from thence through the pipes I into the chambers of the trays, discharging mostly at the center of the trays, the other side of the partitions, although some of it discharges into the sections of the chambers nearest the supply-pipe. By discharging the steam as described, the tops of the trays are more uniformly heated than would be the case if the steam were discharged directly into the ends of the trays. The steam issuing from the ends of the pipes is projected some distance into the sections of the chambers into which the ends open; but the perforations of the other portions of the pipes permit the escape of steam into those sections, so that the heat is very quickly and uniformly distributed, and the best results are believed to be attained by such distribution.

By providing each pipe with a valve, the quantity of steam to enter each tray may be controlled, so that by throwing more steam into one chamber than into another a uniform temperature may be maintained through the whole series of trays, or one tray may be heated more than another, as desired.

It may be desirable at times to have the heat greater in one chamber than in another, and under my construction such variance in temperature may be regulated; and when desirable the steam can be completely cut off from any one tray.

Any one or more of the trays can be removed from the frame without disturbing the others. The transverse partitions brace and strengthen the trays and support the inner ends of the pipes, and the perforations therein permit the steam to pass from one section to another, and the notches permit the water of condensation to flow from one end of the chambers to the cocks at the other end.

Having described my invention and fully set forth it merits, what I claim is—

1. The combination of the frame, the series of trays supported therein, the transverse perforated partition within each tray, the steam-inlet pipes entering the chambers of the trays and said partitions, and terminating at or near the middle of the trays, and perforated for the escape of steam, the steam-supply pipe for connecting said pipes with a steam-generator, and valves for controlling the passage of steam from the steam-supply pipe to the several trays, substantially as described.

2. The combination of the hollow tray, the transverse perforated partition within the same, and the steam-inlet pipe entering the chamber of the tray and the said partition, and perforated for the escape of steam, substantially as and for the purposes set forth.

In testimony whereof I affix my signature in presence of two witnesses.

FRANCIS M. TRAVIS.

Witnesses:
C. E. SHOBER,
H. B. ZEVELY.